Figures 1, 2:
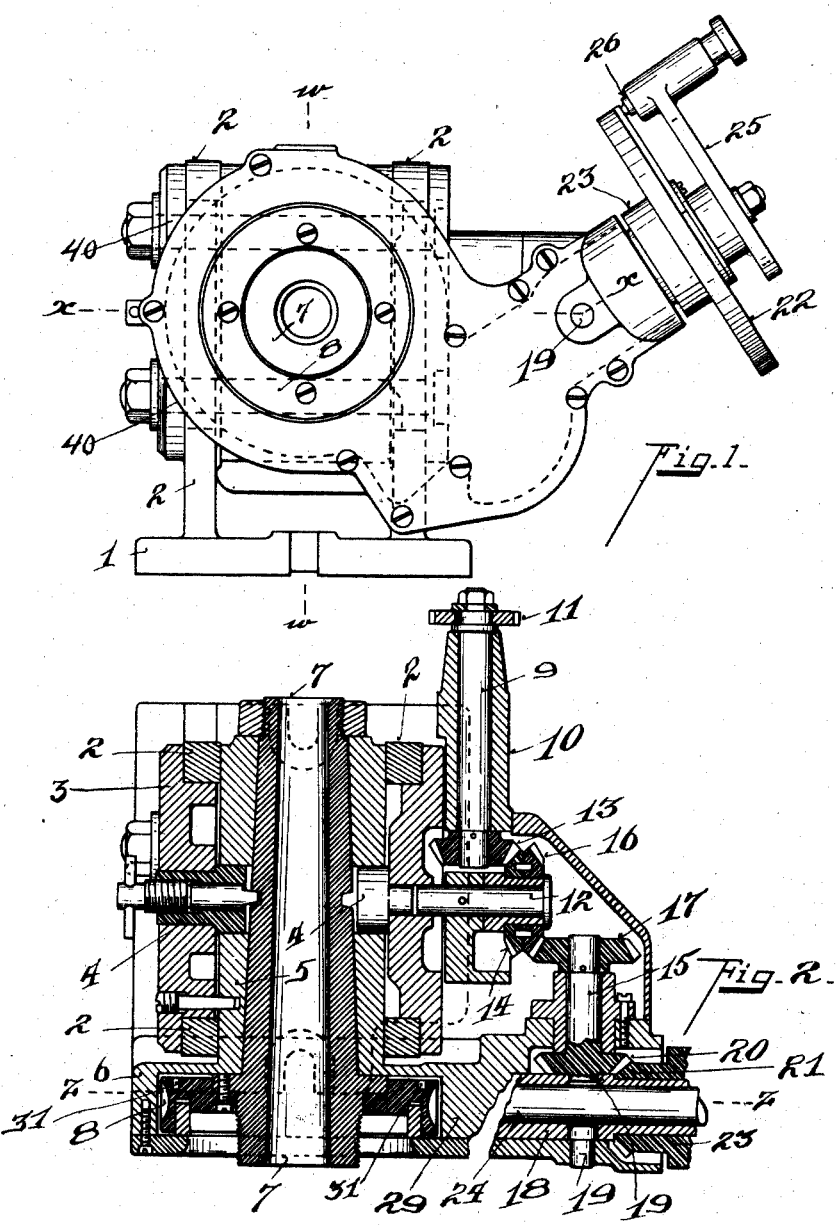

No. 864,873.　　　　　　　　　　　　　　　　PATENTED SEPT. 3, 1907.
L. THIEL.
DIVIDING HEAD.
APPLICATION FILED JUNE 25, 1906.

2 SHEETS—SHEET 1.

Witnesses
Olive B. Kaiser
Leo O'Donnell

Inventor
Louis Thiel
By Wood & Wood
Attorneys

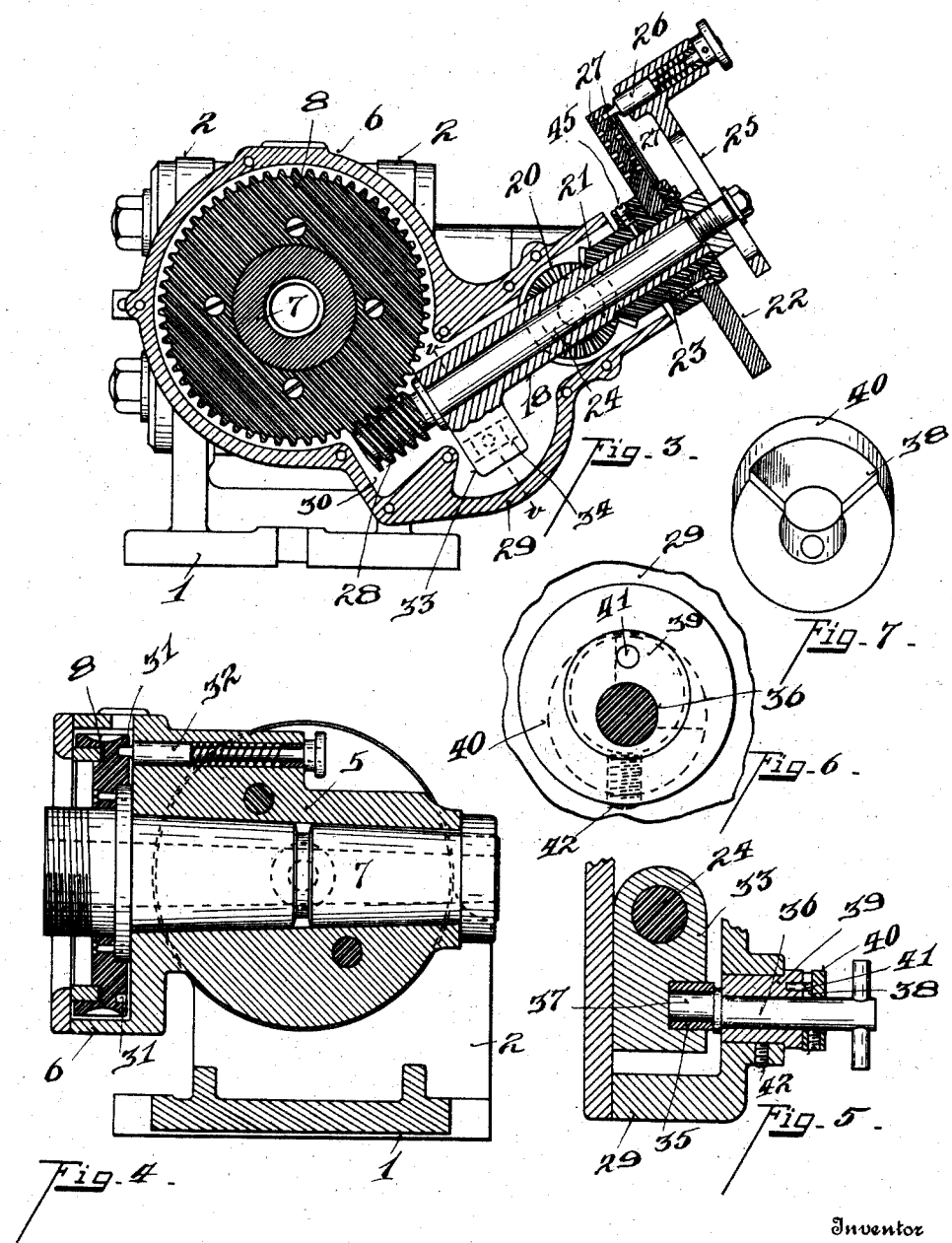

UNITED STATES PATENT OFFICE.

LOUIS THIEL, OF CINCINNATI, OHIO.

DIVIDING-HEAD.

No. 864,873.  Specification of Letters Patent.  Patented Sept. 3, 1907.

Application filed June 25, 1906. Serial No. 323,387.

*To all whom it may concern:*

Be it known that I, LOUIS THIEL, a citizen of the United States, residing at Cincinnati, in the county of Hamilton and State of Ohio, have invented certain new and useful Improvements in Dividing-Heads, of which the following is a specification.

My invention relates to an improved dividing-head for milling machines.

One of the objects of my invention is to provide a maximum size dividing-wheel with a minimum sized head structure. The object of having a relatively large dividing wheel is to provide greater accuracy and durability.

Another object of my invention is to provide, in a dividing-head of the universal type, a worm shaft, the worm end of which rocks in a straight line to and from the worm, or dividing wheel.

Another object of my invention relates to the arrangement of the transmission elements between the power shaft and spindle.

Other features of the invention relate to structural features of the head which will be more fully set forth in the description of the accompanying drawings, forming a part of this specification, in which:—

Figure 1 is a front elevation of my improved dividing-head. Fig. 2 is a section on line x, x, Fig. 1. Fig. 3 is a section on line z, z, Fig. 2. Fig. 4 is a section on line w, w, Fig. 1. Fig. 5 is an enlarged section on line v, v, Fig. 3. Fig. 6 is an enlarged detailed front elevation of the eccentric bushing for adjusting the shaft employed for throwing in and out the worm with its driven worm wheel. Fig. 7 is an enlarged detailed perspective view of the stop plate for limiting the movement of the worm adjusting shaft.

1 represents the frame having the uprights 2 forming journal bearings for the plates 3, see Fig. 2, which plates are bolted together by bolts 40, see dotted lines Fig. 1, upon opposite sides of the head. The entire head is swiveled relative to the frame on the horizontal pivots 4, see Fig. 2. In the head is a spindle bearing sleeve 5, its front end being radially extended to form a guard flange 6 for the dividing wheel. 7 represents the spindle journaled in said sleeve. It will be noted that this flange 6 lies completely outside of the frame and surrounds the front end of the spindle. Within this flange 6 and secured to the spindle 7 is the worm dividing wheel 8. It will be noted that this dividing wheel is relatively large, in fact being substantially equal in diameter to the diameter of the head taken on a vertical plane transverse to the spindle, and this organization permits as large a dividing wheel to be used as is practicably desirable.

I will now describe the driving and indexing mechanism for the spindle, see Figs. 2 and 3. 9 represents the power shaft of the head journaled in the sleeve of bracket 10 rigidly supported by the frame upright. 11 represents a gear wheel upon the rear end of shaft 9 which takes its drive from change gears, not shown, but which are driven from the lead screw of the machine. 12 represents a stud shaft supported by the bracket at right angles to the shaft 9 and coincidentally relative to the pivot 4. 13 represents a bevel gear wheel fixed to shaft 9 meshing with a bevel gear wheel 14 attached to bevel gear 16, both of which are loose on the stud 12. 15 represents an intermediate shaft journaled in suitable bearings in the head 3 and arranged radially relative to the stud shaft 12 and the pivots 4. 16 represents a bevel gear attached to bevel gear 14, and loose on stud 12 and meshing with the gear wheel 17 fixed on shaft 15. It is fixed to revolve with gear 13, and constitutes the driving gear wheel for the head.

From the arrangement thus described it will be seen that when the head 3 is swiveled on the horizontal pivots 4, that the shaft 15 by reason of its radial arrangement relative to the center of rotation will travel concentrically around stud shaft 12, with the gear wheel 17 rolling around the periphery of and remaining in mesh with gear wheel 16.

I will now describe the indexing mechanisms which constitute elements in the transmission, see Figs. 2 and 3. 18 represents a sleeve swiveled on pivots 19, said pivots being supported by the head, so that the said sleeve is non-rotatable on its longitudinal axis. Pivots 19 are arranged concentrically relative to the shaft 15, so that the sleeve 18 extends radially upon both sides of shaft 15 as a center. 20 represents a bevel gear wheel fixed on shaft 15 and engaging with a bevel gear wheel 21 loosely journaled on sleeve 18. 22 represents the indexing disk fixed on the front end of the sleeve 23 of the gear wheel 21. 24 represents the worm shaft journaled in sleeve 18 and having the crank 25 on its front end carrying the usual indexing pin 26 adapted to selectively engage the indexing holes 27 of the disk 22. 28 represents the worm of shaft 24 adapted to engage and disengage the worm wheel 8 when the sleeve 18 is rocked to and from the spindle. It will be noted that the head has the laterally extended integral structure 29 downwardly inclined from its outer end and forming a casing or housing for the shafts 15 and 24 of their gears. This casing is so constructed that it forms an oil well 30, see Fig. 3 for the worm 28. When sleeve 18 is rocked on pivots 19 to engage and disengage the worm mechanism, the worm shaft 24 rocks on intermediate shaft 15 as a center, bevel gear wheel 21 revolving around the periphery of and remaining in mesh with bevel gear wheel 20 of intermediate shaft 15. 45 represents a set screw, its inner end extending through the sleeve 23 and is adapted to be brought to bear against the sleeve 18 so as to lock the train of gearing against rotation when it is desired to manipulate the crank 25 for hand spacing. The rear face of the dividing wheel 8 is provided with a coincident series of orifices 31 adapted to be selectively engaged by the pin 32 in the head when it is desired to use this means of direct indexing.

Following is a description of the means for rocking the sleeve 18, see Figs. 3, 5, 6 and 7. 33 represents a lug depending from the inner end of sleeve 18, said lug has a longitudinal slot 34 in which is slidably mounted a slide plate 35. 36 represents a shaft having the eccentric end 37 journaled in an orifice in the plate 35. The front end of shaft 36 is journaled in an eccentric bushing 39 set in the casing 29. 40 represents a cover plate fixed on the outer end of shaft 36 and provided with a segmental slot 38. 41 represents a pin in the eccentric bushing 39 projecting through the slot 38, so that when the shaft 36 is rocked the sides of the slot 38 will strike against the pin 41 and limit the movement of the shaft 36 in both directions. 42 represents a set screw passing through the frame 29 and engaging against the periphery of the eccentric bushing 39.

It is obvious that rocking shaft 36 in opposite directions engages and disengages the worm shaft 24 with the worm dividing wheel 8. Any wear of the worm engaging surfaces may be readily compensated by setting the eccentric bushing 39.

Having described my invention, I claim:—

1. In a dividing-head for milling machines, a frame, the head being swiveled on a horizontal axis in said frame, a spindle in the head, and a dividing wheel on the front end of the spindle outside of the head structure, a driving gear wheel journaled on the frame concentrically relative to the horizontal pivots of the head, an intermediate shaft journaled in the head having a gear wheel intermeshing with the driving gear wheel, said intermediate shaft being radially arranged relative to said driving gear wheel, a worm shaft arranged at right angles to and radially relative to said intermediate shaft, intermeshing gear wheels and indexing mechanism connecting said shafts, pivots supporting said worm shaft whereby it is rocked around the intermediate shaft as a center, and means for rocking the inner end of said worm shaft to engage and disengage the dividing worm wheel, substantially as described.

2. In a dividing-head for milling machines, a frame, a head swiveled on a horizontal axis therein, a power wheel suported by the frame, an intermediate shaft journaled in the head, said power wheel being concentrically arranged relative to the said axis and the intermediate shaft being radially arranged relative to the power wheel, an intermediate gear in mesh with the power wheel, a sleeve swiveled in the casing formed by the head at right angles to and radially relative to the intermediate shaft, a worm shaft journaled in said sleeve adapted to engage and disengage the dividing wheel when said sleeve is rocked, and bevel gear wheels and indexing mechanism connecting the said intermediate shafts and worm shafts in driven relationship, substantially as described.

In testimony whereof, I have hereunto set my hand.

LOUIS THIEL.

Witnesses:
  OLIVER B. KAISER,
  LEO O'DONNELL.